US007031368B1

(12) United States Patent
Maruta et al.

(10) Patent No.: US 7,031,368 B1
(45) Date of Patent: Apr. 18, 2006

(54) ADAPTIVE TRANSMITTER/RECEIVER

(75) Inventors: Yasushi Maruta, Tokyo (JP); Shousei Yoshida, Tokyo (JP)

(73) Assignee: NEC Corporation, (JP)

( * ) Notice: Subject to any disclaimer, the term of this patent is extended or adjusted under 35 U.S.C. 154(b) by 0 days.

(21) Appl. No.: 09/720,700

(22) PCT Filed: Jun. 29, 1999

(86) PCT No.: PCT/JP99/03478

§ 371 (c)(1),
(2), (4) Date: Dec. 29, 2000

(87) PCT Pub. No.: WO00/01088

PCT Pub. Date: Jan. 6, 2000

(30) Foreign Application Priority Data

Jun. 30, 1998 (JP) .............................. 10-185234

(51) Int. Cl.
*H04B 1/69* (2006.01)
(52) U.S. Cl. ..................................... 375/130
(58) Field of Classification Search ................ 375/130, 375/133, 141, 135, 136, 146, 147, 219, 220, 375/222; 455/561, 562, 101, 69, 63, 504, 455/103
See application file for complete search history.

(56) References Cited

U.S. PATENT DOCUMENTS

| | | | | |
|---|---|---|---|---|
| 5,303,240 A | * | 4/1994 | Borras et al. ............... | 370/347 |
| 5,745,858 A | * | 4/1998 | Sato et al. ................ | 455/562.1 |
| 5,781,845 A | * | 7/1998 | Dybdal et al. ................ | 455/65 |
| 5,960,330 A | * | 9/1999 | Azuma ........................ | 455/70 |
| 5,999,826 A | * | 12/1999 | Whinnett .................... | 455/561 |
| 6,037,898 A | * | 3/2000 | Parish et al. ................ | 342/174 |
| 6,061,553 A | * | 5/2000 | Matsuoka et al. ........... | 455/273 |
| 6,070,086 A | * | 5/2000 | Dobrica ....................... | 455/522 |
| 6,085,104 A | * | 7/2000 | Kowalski et al. ............ | 455/506 |
| 6,091,788 A | * | 7/2000 | Keskitalo et al. ........... | 375/347 |
| 6,154,661 A | * | 11/2000 | Goldburg .................. | 455/562.1 |

(Continued)

FOREIGN PATENT DOCUMENTS

JP 57-20001 2/1982

(Continued)

OTHER PUBLICATIONS

H. Wang, et al., "Adaptive Array Antenna Combined With Tapped Delay Line Using Processing Gain For Direct-Sequence/Spread-Spectrum Multiple Access System", *Shingakuron*, vol. J75-B-II, No. 11, Nov. 1992, pp. 815-825.

(Continued)

*Primary Examiner*—Emmanuel Bayard
(74) *Attorney, Agent, or Firm*—Dickstein, Shapiro, Morin & Oshinsky, LLP.

(57) ABSTRACT

There is provided an adaptive transceiver device which estimates a path arrival direction of a desired wave signal by using a reception antenna weight of a k-th user adaptive reception unit using a control method based on the minimum mean square error (MMSE) standards and which generates a transmission antenna weight on the basis of the path arrival direction. The adaptive transceiver device is characterized in that in reception, a directivity pattern for suppressing interference caused by another user or a multi-path is formed, an arrival direction of a path is estimated from the reception antenna weight, and a transmission direction is predicted from the estimated arrival direction to generate a transmission antenna weight, and in transmission, a directivity pattern for decreasing interference to another user is formed and transmitted.

19 Claims, 13 Drawing Sheets

U.S. PATENT DOCUMENTS 6,192,256 B1 * 2/2001 Whinnett ................ 455/562.1

FOREIGN PATENT DOCUMENTS

| JP | 5-41607 | 2/1993 |
| JP | 6-53870 | 2/1994 |
| JP | 6-61894 | 3/1994 |
| JP | 8-274687 | 10/1996 |
| JP | 10-285092 | 10/1998 |

OTHER PUBLICATIONS

S. Tanaka, et al., "The Performance of Decision-Directed Coherent Adaptive Diversity in DS-CDMA Reverse Link", Technical Report of IEICE, RCS96-102, Nov. 1996, pp. 25-30.

* cited by examiner

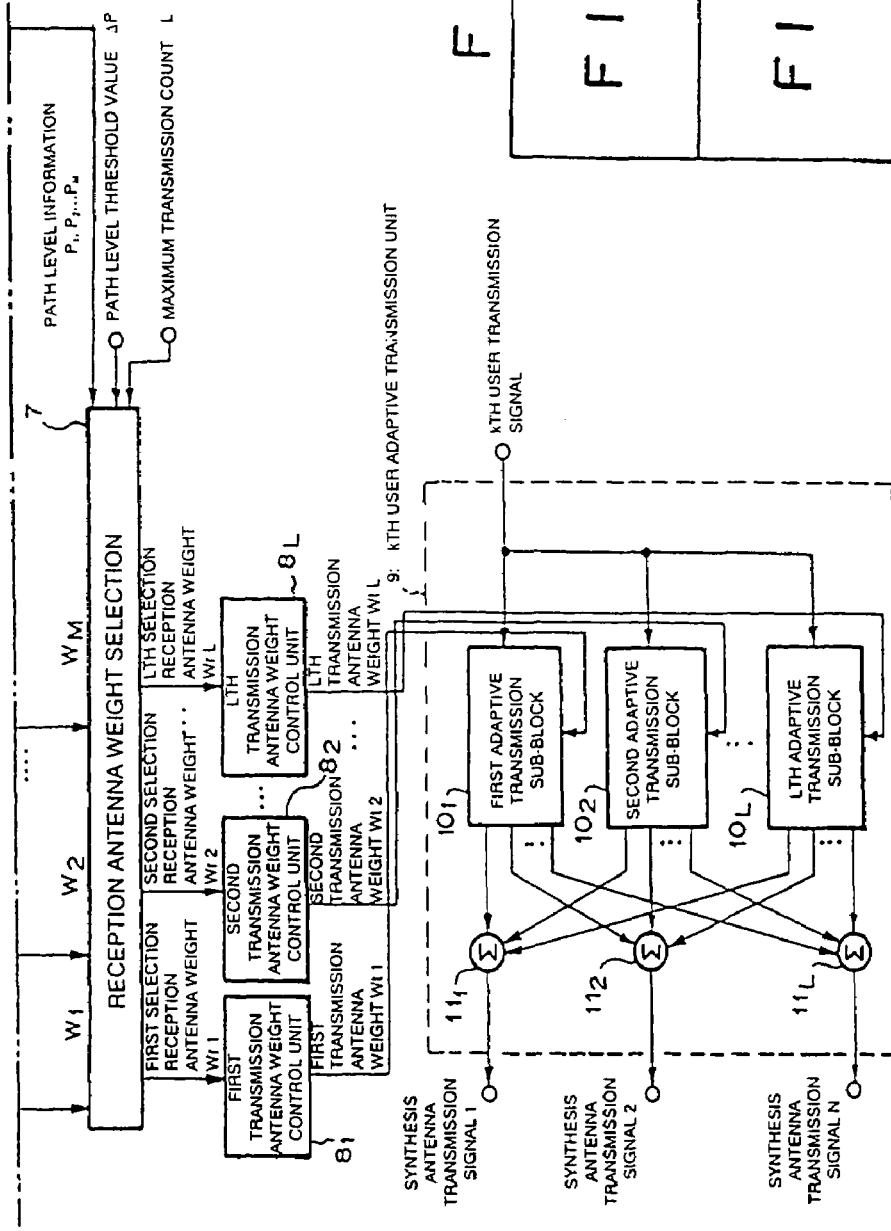
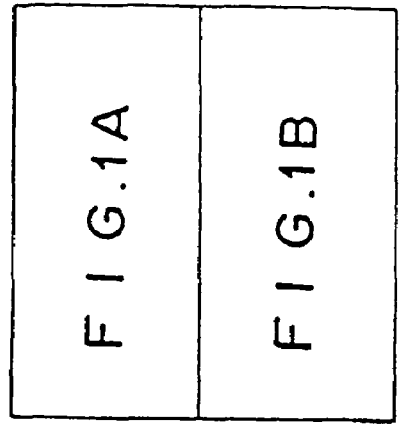

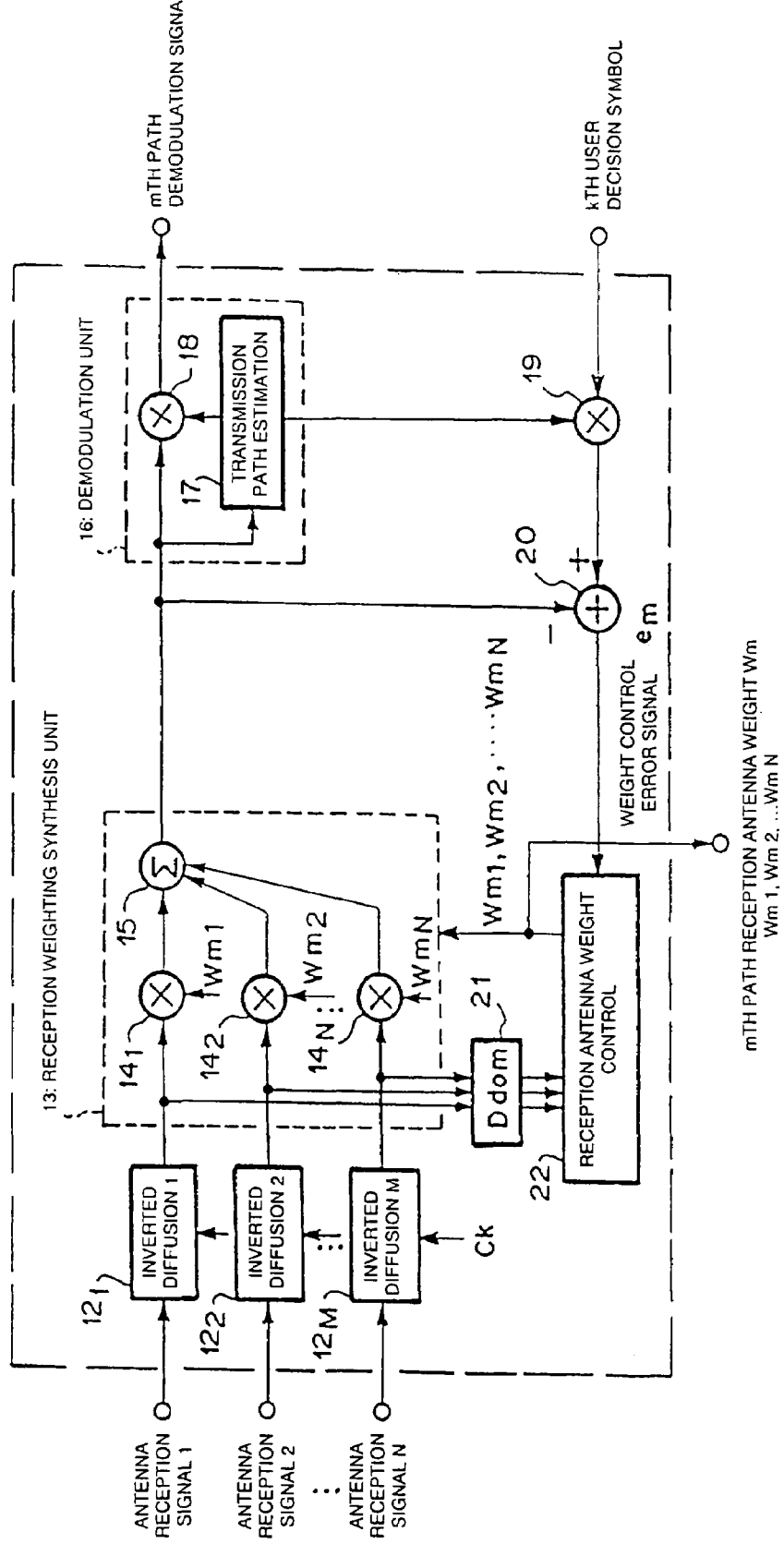

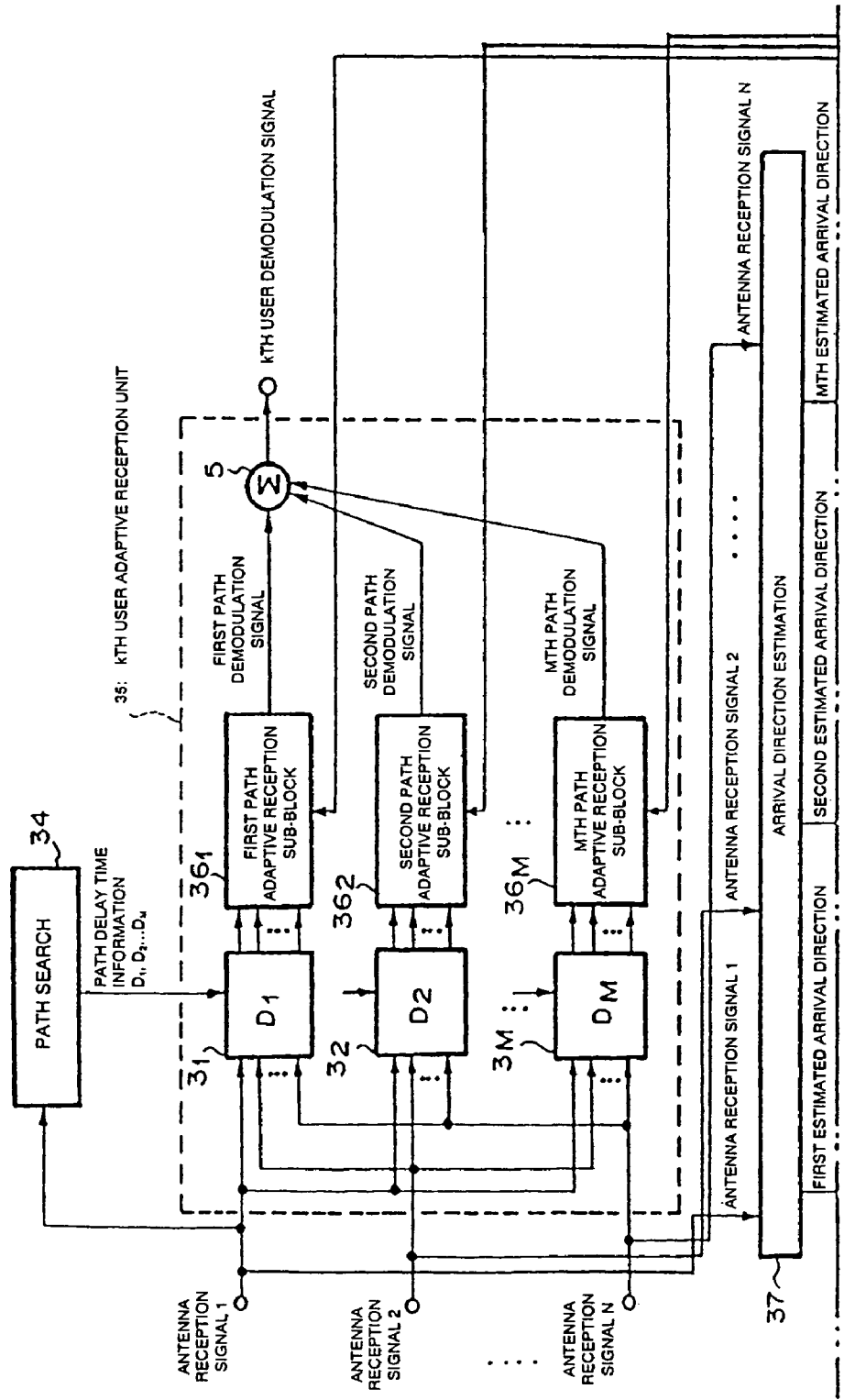

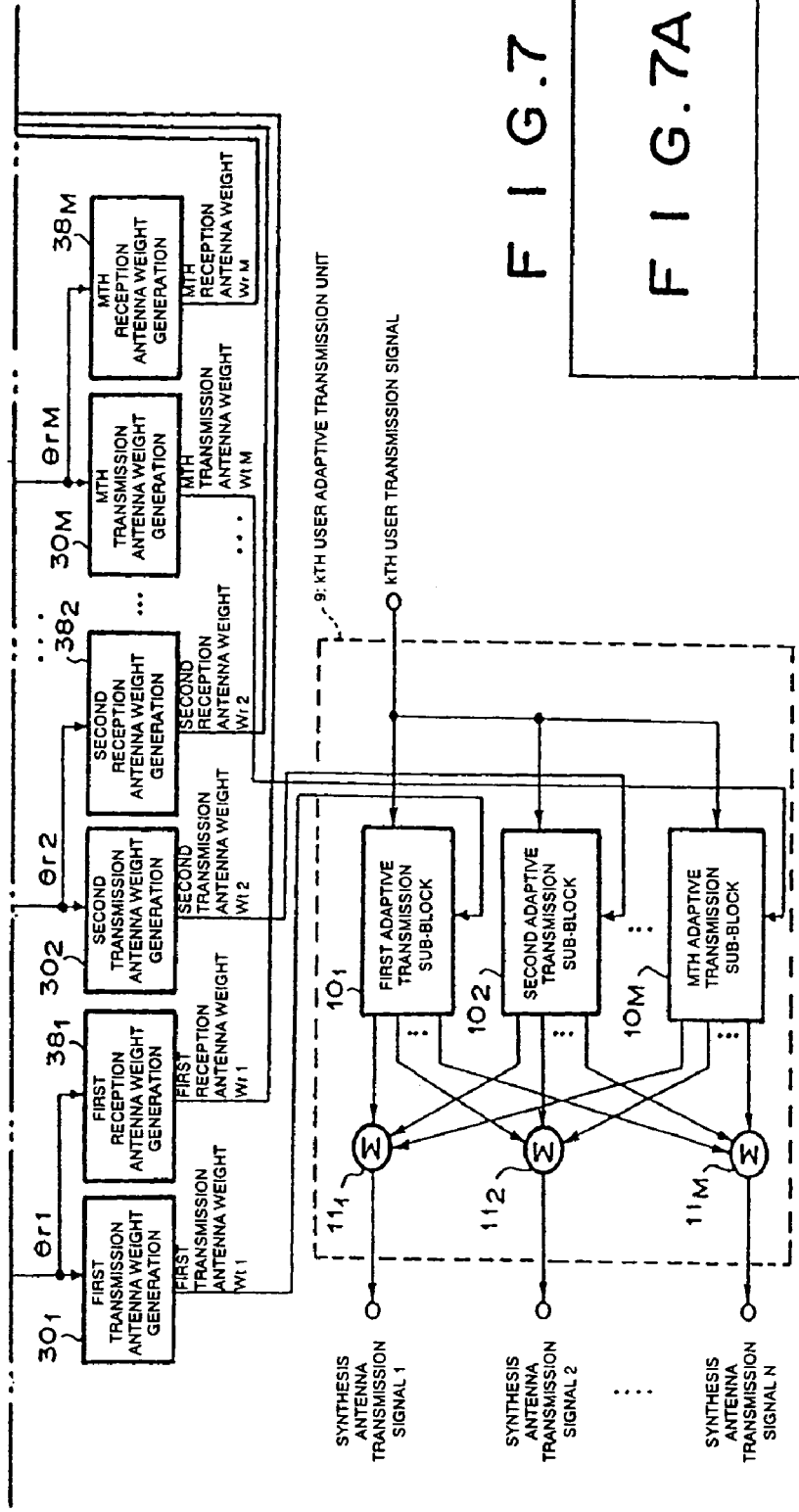

ADAPTIVE TRANSMITTER/RECEIVER

This application is a 371 of PCT/JP99/03478 filed on Jun. 29, 1999.

TECHNICAL FIELD

The present invention relates to an adaptive transceiver device for base station which removes interference caused by another user in reception and which decreases interference to another user in transmission by antenna directivity control and, more particularly, to an adaptive transceiver device using the CDMA (Code Division Multiple Access) system.

BACKGROUND ART

In recent years, in a cellular mobile communication system or the like, as a radio transmission method which can use a large number of channels in the same frequency band so that a large scriber's capacity can be expected, the CDMA (Code Division Multiple Access) system has been widely noticed. On the other hand, an adaptive transceiver device in which interference from another user or an interference caused by a delay wave is removed in transmission by using an adaptive antenna as an antenna for base station and in which no interface is given to another user in transmission has been greatly discussed.

In addition, as an adaptive transceiver device which is appropriate to the CDMA system, a system which controls a directional antenna using such a directivity pattern that an antenna gain is maximum with respect to an arrival direction to perform transmission and reception has been proposed.

FIGS. 7A and 7B (to be referred to as FIG. 7 hereinafter) are block diagrams showing an example of a k-th user adaptive transceiver device in a base station using the conventional DS (Direction Sequence)-CDMA system. FIG. 8 is a block diagram showing an m-th path adaptive reception sub-block 36m of the conventional k-th user adaptive transceiver device shown in FIG. 7. FIG. 9 is a block diagram showing an m-th adaptive transmission sub-block 10m of the conventional k-th user adaptive transceiver device shown in FIG. 7. Here, these drawings show an adaptive transceiver device (CDMA adaptive transceiver device) having a configuration defined as described below. That is, the number of transmission/reception antennas is represented N (N is an integer which is 1 or more), the number of users is represented by K (K is an integer which is 1 or more), and the number of multi-paths and the number of transmission paths per user are represented by M (M is an integer which is 1 or more).

The conventional k-th user adaptive transceiver device is constituted by a second path search circuit 34, a second k-th user adaptive reception unit 35, a first arrival direction estimation circuit 37, reception antenna weight generation circuits 381 to 38M, transmission antenna weight generation circuits 301 to 30M, and a k-th user adaptive transmission unit 9.

N antenna reception signals 1 to N are signals obtained by performing code multiplexing to a desired wave signal and a plurality of interference wave signals received by N antenna elements arranged and closed to each other such that the respective reception signals are correlative to each other. Since the following processes are digitally performed in a base band, it is assumed that the frequencies of the N antenna reception signals 1 to N are converted from a radio band to a base band, and that the N antenna reception signals 1 to N are subjected to analog-to-digital conversion.

The second path search circuit 34 calculates pieces of path delay time information D1 to DM of a desired wave signal of the k-th user from the reception signals multiplexed by a plurality of user signals.

The second k-th user adaptive reception unit 35 is constituted by first delay circuits 31 to 3M, second m-th path adaptive reception sub-blocks 361 to 36M, and a first adder 5.

The first delay circuits 31 to 3M delay the N antenna reception signals 1 to N depending on a multi-path on the basis of the pieces of path delay time information D1 to DM of a desired wave signal which is an output from the second path search circuit 34.

The first adder 5 adds outputs from the second m-th path adaptive reception sub-blocks 361 to 36M to each other to output a k-th user demodulation signal.

The second m-th path adaptive reception sub-blocks 361 to 36M, as shown in FIG. 8, is constituted by despreading circuits 121 to 12M, a reception weighting combining unit 13, and a demodulation unit 16. The second m-th path adaptive reception sub-blocks 361 to 36M receives the antenna reception signals 1 to N and m-th reception antenna weights Wr1 to WrM which are outputs from reception antenna weight generation circuits 381 to 38M.

Despreading circuits 121 to 12N perform a correlative calculation of the antenna reception signals 1 to N and a pseudo random code Ck. It is assumed that the pseudo random code Ck is a complex code consisting of two codes CkI and CkQ which are orthogonal to each other. In this case, each of the despreading circuits 121 to 12N can be realized by one complex multiplier and an averaging circuit operating over a symbol section. Each of the despreading circuits 121 to 12N can also be realized by a transversal filter configuration using the code Ck as a tap weight.

The reception weighting combining unit 13 is constituted by first complex multipliers 141 to 14N and a second adder 15. The outputs from the despreading circuits 121 to 12N are multiplied by m-th reception antenna weights Wm1 to WmN, respectively, and the resultant values are summed up, so that the received signal is generated by an antenna directivity pattern inherent in the m-th path.

A demodulation unit 16 is constituted by a transmission path estimation circuit 17 and a second complex multiplier 18. An output obtained by multiplying an output from the reception weighting combining unit 13 by a complex conjugate of transmission path estimation outputs serves as an output from the second m-th path adaptive reception sub-block 36m.

Outputs from the second m-th path adaptive reception sub-block 36m are added to each other by the adder 5, and an output from the adder 5 serves as a demodulated signal from the k-th user.

Next, the first arrival direction estimation circuit 37 receives N antenna reception signals 1 to N as inputs, and estimates the arrival direction of M desired wave signals of the k-th user from reception signals multiplexed by a plurality of user signals. As a method of estimating an arrival direction, e.g., the MUSIC method is known.

The M m-th reception antenna weight generation circuits 381 to 38M calculate m-th reception antenna weights (steering vectors) Wr1 to WrM for forming directivity patterns having gains in a desired signal arrival direction on the basis of M estimated arrival directions θr1 to θrM which are outputs from the first arrival direction estimation circuit 37.

The M m-th transmission antenna weight generation circuits 301 to 30M calculate m-th transmission antenna weights (steering vectors) Wt1 to WtM for forming directivity patterns having gains in a user transmission direction which is the same as the desired signal arrival direction on the basis of the M estimated arrival directions θn1 to θrM which are the outputs from the first arrival direction estimation circuit 37.

When the FDD (Frequency Division Duplex) method is used, a frequency in reception is different from a frequency in transmission. For this reason, a reception antenna weight and a transmission antenna weight must be independently determined on the basis of the estimated arrival direction. When the TDD (Time Division Duplex) method, a frequency in reception is equal to a frequency in transmission. For this reason, a reception antenna weight can also be directly employed as a transmission antenna weight.

The k-th user adaptive transmission unit 9 is constituted by the m-th adaptive transmission sub-blocks 101 to 10M and the third adders 111 to 11N.

The third adders 111 to 11N synthesize outputs from the m-th adaptive transmission sub-blocks 101 to 10M with each other for N transmission antennas, and outputs N synthesized antenna transmission signals 1 to N. The N synthesized antenna reception signals 1 to N are subjected to digital/analog conversion. The frequencies of the N synthesized antenna reception signals 1 to N are converted from a base band to a radio band.

Each of the first adaptive transmission sub-blocks 101 to 10M, as shown in FIG. 9, is constituted by a transmission weighting combining unit 31 and spreading circuits 331 to 33N. The m-th adaptive transmission sub-blocks 101 to 10M receive m-th reception antenna weight Wtm (Wtm1 to WtmM) which are outputs from the M transmission antenna weight generation circuits 301 to 30M and a k-th user transmission signal.

The transmission weighting combining unit 31 is constituted by fourth complex multipliers 321 to 32N. The k-th user transmission signal is multiplied by the m-th transmission antenna weight Wtm (Wtm1 to WtnN) to generate a signal transmitted by an antenna directivity pattern inherent in the m-th path.

The spreading circuits 331 to 33N diffuses N outputs from the transmission weighting combining unit 31 by using the pseudo random code Ck of the k-th user to generate N antenna transmission signals 1 to N. When the pseudo random code Ck is considered as a complex code consisting of two codes CkI and CkQ which are orthogonal to each other, each of the spreading circuits 331 to 33N is realized by one complex multiplier and an averaging circuit operating over a symbol section. Each of the spreading circuits 331 to 33N can also be realized by a transversal filter configuration using the code Ck as a tap weight.

The N antenna reception signals 1 to N include desired wave signal components, interference wave signal components, and thermal noise. In addition, the desired wave signal component and the interference wave signal component include multi-path components. In general, these signal components are arrived from different directions. The conventional CDMA adaptive transceiver device shown in FIGS. 7 to 9 prepares the first arrival direction estimation circuit 37 to estimate the arrival directions of the multi-paths of desired signals, weighting combining of a reception signal in the reception weighting combining unit 13 and weighting combining of a transmission signal in the transmission weighting combining unit 31 are performed such that the signal powers of the paths are maximized. As a result, antenna gains (directivity patterns) of the second m-th path adaptive reception sub-blocks 361 to 36M and the m-th adaptive transmission sub-blocks 101 to 10M are formed to be increased with respect to the arrival directions of the multi-paths of the desired signals in reception.

When the FDD (Frequency Division Duplex) method is used, a frequency in reception is different from a frequency in transmission. For this reason, a reception antenna weight and a transmission antenna weight must be independently determined on the basis of the estimated arrival direction. When the TDD (Time Division Duplex) method, a frequency in reception is equal to a frequency in transmission. For this reason, a reception antenna weight can also be directly employed as a transmission antenna weight.

As a receiver device using an adaptive antenna appropriate to the CDMA system, a device obtained by a spectrum spreading process gain is proposed. Conventionally, the CDMA adaptive receiver device of this type, as described in "Wang, Kohno, and Imai, "Adaptive Array Antenna Combined with Trapped Delay Line Using Processing Gain for Direct-Sequence/Spread-Spectrum Multiple Access System", Shingakuron Vol. J75-B-II No. 11, pp 815–825, 1992", "Tanaka, Miki, and Sawahashi, "The Performance of Decision-Directed Coherent Adaptive Diversity in DS-CDMA Reverse Link", TECHNICAL REPORT OF IEICE. RC596-102, 1996-11", in reception antenna weight control, a weight control error signal extracted after despreading is used to obtain an SINR improvement effect obtained by a process gain in adaptive control.

FIG. 10 is a block diagram showing another example of the conventional k-th user adaptive receiver device. FIG. 11 is a block diagram showing an m-th path adaptive reception sub-block 40m of the conventional k-th user adaptive transceiver device shown in FIG. 10. Here, these drawings show a k-th user adaptive receiver device (CDMA adaptive transceiver device) having a configuration defined as described below. That is, the number of transmission/reception antennas is represented N (N is an integer which is 1 or more), the number of users is represented by K (K is an integer which is 1 or more), and the number of multi-paths and the number of transmission paths per user are represented by M (M is an integer which is 1 or more).

The conventional k-th user adaptive receiver device is constituted by a second path search circuit 34 and a third k-th user adaptive reception unit 39.

The N antenna reception signals 1 to N are signals obtained by performing code multiplexing to a desired wave signal and a plurality of interference wave signals received by N antennas arranged and closed to each other such that the respective reception signals are correlative to each other. Since the following processes are digitally performed in a base band, it is assumed that the frequencies of the N antenna reception signals 1 to N are converted from a radio band to a base band, and that the N antenna reception signals 1 to N are subjected to analog/digital conversion.

The second path search circuit 34 calculates pieces of path delay time information D1 to DM of a desired wave signal of the k-th user from the reception signals multiplexed by a plurality of user signals.

The third k-th user adaptive reception unit 39 is constituted by first delay circuits 31 to 3M, third m-th path adaptive reception sub-blocks 401 to 40M, a first adder 5, and a decision circuit 6.

The first delay circuits 31 to 3M delay N antenna reception signals 1 to N depending on a multi-path on the basis of pieces of path delay time information D1 to DM of a desired wave signal which is an output from the second path search circuit 34.

The first adder 5 adds outputs from the third m-th path adaptive reception sub-blocks 401 to 40M to each other to output a k-th user demodulation signal.

The decision circuit 6 performs hard decision to an output from the first adder 5 to output a k-th user decision symbol.

Each of the third m-th path adaptive reception sub-blocks 401 to 40M is constituted by despreading circuits 121 to 12M, a reception weighting combining unit 13, a demodulation unit 16, a third complex multiplier 19, an error detection circuit 20, a second delay circuit 21, and a reception antenna weight control circuit 22. The third m-th path adaptive reception sub-blocks 401 to 40M receive antenna reception signals 1 to N and a k-th user decision symbol which is an output from the decision circuit 6.

The despreading circuits 121 to 12N perform correlative calculation between the antenna reception signals 1 to N delayed by the first delay circuits 31 to 3M and the pseudo random code Ck of the k-th user. When the pseudo random code Ck is considered as a complex code consisting of two codes CkI and CkQ which are orthogonal to each other, each of the despreading circuits 121 to 12N is realized by one complex multiplier and an averaging circuit operating over a symbol section. Each of the despreading circuits 121 to 12N can also be realized by a transversal filter configuration using the code Ck as a tap weight.

The reception weighting combining unit 13 is constituted by first complex multipliers 141 to 14N and a second adder 15. The outputs from the despreading circuits 121 to 12N are multiplied by m-th reception antenna weights Wm1 to WmN, respectively, and the resultant values are summed up, so that the received signal is generated by an antenna directivity pattern inherent in the m-th path.

The demodulation unit 16 is constituted by a transmission path estimation circuit 17 and a second complex multiplier 18. An output obtained by multiplying an output from the reception weighting combining unit 13 by a complex conjugate of transmission path estimation outputs serves as an output from the third m-th path adaptive reception sub-block 40m.

The third complex multiplier 19 multiplies the transmission path estimation output by the k-th user decision symbol.

When the k-th user decision symbol is multiplied by transmission path estimation values of the respective paths, only components related to the phases of the estimation values can be multiplied, and amplitudes calculated by another means may also be multiplied. Another means indicates such a means that a reception power is measured to calculate an amplitude.

The error detection circuit 20 calculates the difference between an output from the third complex multiplier 19 and an output from the reception weighting combining unit 13 to detect a reception antenna weight control error em.

The second delay circuit 21 delays outputs from the despreading circuits 121 to 12N depending on process times of the reception weighting combining unit 13, the demodulation circuit 16, the error detection circuit 20, and the like.

The reception antenna weight control circuit 22 calculates reception antenna weights Wm1 to WmN from a reception antenna weight control error em and an output from the second delay circuit 21.

In a convergence process of adaptive control, a known symbol may also be used in place of the decision symbol.

The N antenna reception signals 1 to N include desired wave signal components, interference wave signal components, and thermal noise. In addition, the desired wave signal component and the interference wave signal component include multi-path components, respectively. In general, these signal components are arrived from different directions. In the conventional CDMA adaptive transceiver device shown in FIGS. 9 and 10, the third m-th path adaptive reception sub-blocks 401 to 40M are independently prepared for the multi-path components of the desired wave signals, and weighting combining of reception signals are performed in the reception weighting combining units 13 such that a ratio of the desired wave signals of the signal components of the respective paths to an interference wave signal power (SIR) is maximized. As a result, the antenna gains (directivity pattern) of the third m-th path adaptive reception sub-blocks 401 to 40M with respect to arrival directions are formed such that the antenna gains are increased with respect to the arrival directions of the signal components of the respective paths and decreased with respect to other delay wave signal components and the interference wave signal component.

As a method of controlling a reception antenna weight which maximizes the ratio of the desired wave signals to an interference wave signal power (SIR), a method of controlling a reception antenna weight on the basis of the MMSE (Minimum Mean Square Error) standards such that the average power of the reception antenna weight control error em is minimized. In the control method based on the MMSE standards, a path arrival direction of a desired wave signal need not be known, and the path arrival direction of the desired wave signal cannot be directly known. Therefore, in order to generate transmission antenna weight for forming a transmission direct ivity pattern as in the conventional CDMA adaptive transceiver device shown in FIGS. 7 to 9, another means for estimating the path arrival direction of the desired wave signal is required.

Here, as adaptive control performed by the MMSE standards, for example, an LMS (Least Mean Square) algorithm is cited.

However, the first disadvantage of the conventional technique is as follows. In the reception unit of the conventional k-th user adaptive transceiver device shown in FIGS. 7 to 9, control for forming a directivity pattern which actively decreases a gain with respect to an interference wave cannot be performed, and performance is poorer than that in the control based on the MMSE standards.

More specifically, in the k-th user adaptive reception unit, reception weighting combining is performed by using an antenna weight appropriate to only the path arrival direction of the estimated desired wave signal.

The second disadvantage is as follows. When the conventional k-th user adaptive receiver device for performing control based on the MMSE standards shorn in FIGS. 10 to 11 is used as an adaptive transceiver device, especially, in the FDD method, a desired wave arrival direction estimation means for calculating a transmission antenna weight must be prepared independently of the reception unit, and the device increases in scale. More specifically, in the k-th user adaptive reception unit using a control method based on the MMSE standards, the path arrival direction of a desired wave signal cannot be directly known.

In the TDD method, the reception antenna weight controlled on the basis of the MMSE standards can be directly used as a transmission antenna weight. In addition, when transmission and reception are controlled on the basis of an arrival direction estimation result, performance in the reception is not poor. On the other hand, when control based on the MMSE standards is performed on the reception side, another arrival direction estimation means for transmission is required, and the structure disadvantageously increases in size.

Therefore, it is an object of the present invention to provide a means for estimating the path arrival direction of a desired wave signal by using a reception antenna weight of a k-th user adaptive reception unit using a control method based on the MMSE standards and generating a transmission antenna weight on the basis of the path arrival direction.

DISCLOSURE OF THE INVENTION

An adaptive transceiver device according to the present invention forms a directivity pattern for suppressing interference caused by another user or a multi-path in reception, estimates an arrival direction of a path from a reception antenna weight, predicts a transmission direction from the estimated arrival direction to generate a transmission antenna weight, and forms a directivity pattern for decreasing interference to another user in transmission.

An adaptive transceiver device of a DS-CDMA system according to the present invention is characterized by including: path search means for calculating path level information and path delay time information from an antenna reception signal; M (M is a positive integer) adaptive reception units for receiving N (N is a positive integer) antenna reception signals, forming reception directivity patterns each having a gain in the direction of a desired wave signal every path delay time, receiving the desired wave signals, and suppressing interference wave signals; reception antenna weight selection means for selecting reception antenna weights for L (L is an integer equal to or smaller than M) transmission paths from the M reception antenna weights by using the path level information; L transmission antenna weight control units for determining transmission antenna weights for forming transmission directivity patterns by using outputs from the reception antenna weight selection means; and an adaptive transmission unit for forming the transmission directivity pattern having a gain in a user direction by using the transmission antenna weight which is an output from the transmission antenna weight control unit and outputting N combining antenna transmission signals for transmitting the desired wave signal.

It is a point according to the present invention that the transmission antenna weight is determined by using only the reception antenna weight of the adaptive reception unit (without using other information).

The adaptive transceiver device according to the present invention is characterized in that the adaptive reception unit has: M delay means which receive the N antenna reception signals and the path delay time information which is an output from the path search means and which match timings depending on the path delay times of M multi-paths; M adaptive reception sub-blocks for forming the reception directivity patterns having gains in the directions of the M multi-paths, suppressing the interference wave signal, and receiving and demodulating the desired wave signal; an adder for synthesizing M demodulation signals; and decision means for performing hard decision to output a decision symbol.

According to the present invention, timings are matched on the basis of the path delay time, a directivity pattern is formed every multi-path, and combining (RAKE reception) is finally performed.

In addition, the present invention is characterized in that the antenna reception signal is a CDMA (Code Division Multiple Access) signal, each of the M adaptive reception sub-blocks has: N despreading means which receive the N antenna reception signals and the decision symbol and which performs despreading to each of the N antenna reception signals by using a pseudo random code of the desired wave signal; a reception weighting combining unit for forming the reception directivity pattern; a demodulation unit for performing the transmission path estimation; a multiplier for multiplying the decision symbol by a complex transmission path estimation value which is an output from the demodulation unit to cancel a phase change caused by carrier wave phase synchronization; error detection means for subtracting each output from the despreading means from an output from the multiplier to detect the reception antenna weight control error; delay means for delaying outputs from the N despreading means depending on the process times of the reception weighting combining means, the demodulation means and the like; and reception antenna weight control means for outputting the reception antenna weight on the basis of the minimum mean square error (MMSE) standards such that the average power of the reception antenna weight control error is minimized by using an output from the delay means and the reception antenna weight control error.

According to the present invention, a reception antenna weight is controlled on the basis of the MMSE standards by the m-th path adaptive sub-block. Therefore, a path arrival direction need not be known, and the path arrival direction cannot be directly known.

Furthermore, the present invention is characterized in that the reception weighting combining unit has: N complex multipliers which receive the N antenna reception signals and the reception antenna weights and which multiply the reception signals by N complex reception antenna weights; and an adder for synthesizing respective outputs from the N complex multipliers.

Still furthermore, the present invention is characterized in that the demodulation means has: transmission path estimation means which receives an output from the weighting combining unit to estimate the amplitude and the phase of a carrier wave; complex conjugate operation means for calculating a complex conjugate of complex transmission path estimation values which are output from the transmission path estimation means; and a multiplier for multiplying an output from the complex conjugate operation means by an output from the despreading means to perform carrier wave phase synchronization and, at the same time, to perform weighting for synthesizing a maximum ratio.

According to the present invention, the m-th path antenna weight is detected by the m-th path adaptive sub-block.

In addition, the present invention is characterized in that the reception antenna weight selection means receives M reception antenna weights which are outputs from the M adaptive reception sub-blocks, path level information which is an output from the path search means, a path level threshold value, and a maximum transmission count Lmax, and selects a selection reception antenna weight corresponding to L paths the number of which is not larger than the maximum transmission count Lmax and which has a level set within the range of the level of the maximum path to the path level threshold value from the M reception antenna weights.

According to the present invention, Lmax is equal to or smaller than M, and L is equal to or smaller than Lmax. After some reception antenna weights having large path levels are selected, a transmission antenna weight is determined. Furthermore, when a plurality of paths are selected and transmitted, a transmission diversity effect can be obtained.

The present invention is characterized in that the transmission antenna weight control unit has: an arrival direction estimation unit which receives the selection reception antenna weight to estimate an estimated arrival direction from the selection reception antenna weight; and a transmission antenna weight generation means for calculating a transmission antenna weight for forming a directivity pattern having a gain in the estimated arrival direction which is an output from the arrival direction estimation unit.

According to the present invention, the arrival direction is estimated from the reception antenna weight. A transmission antenna weight is generated by directly setting the estimated arrival direction as a transmission direction. In particular, in the FDD (Frequency Division Duplex) method, since a frequency in reception is different from a frequency in transmission, an arrival direction is temporarily estimated from the reception antenna weight, and the transmission antenna weight must be determined on the basis of the arrival direction. In addition, in the TDD (Time Division Duplex) method, since a frequency in reception is equal to that in transmission, a reception antenna weight can also be employed as a transmission antenna weight.

Furthermore, the present invention is characterized in that the transmission antenna weight control unit has: an arrival direction estimation unit which receives the selection reception antenna weight to estimate an estimated arrival direction from the selection reception antenna weight; transmission direction prediction means for predicting a transmission direction on the basis of the estimated arrival direction which is an output from the arrival direction estimation unit; and transmission antenna weight generation means for calculating a transmission antenna weight for forming a directivity pattern having a gain in the prediction transmission direction which is an output from the transmission direction prediction means.

According to the present invention, an arrival direction is estimated from a reception antenna weight. A transmission direction is predicted from an estimated arrival direction. In addition, a prediction transmission direction is set as a transmission direction, so that a transmission antenna weight is generated. In either one of the FDD method and the TDD method, a transmission direction is predicted, so that a transmission antenna weight can be generated.

The present invention is characterized in that the arrival direction estimation unit has: arrival direction generation means which receives the selection reception antenna weight to sweep arrival directions over all the directions; steering vector generation means for calculating an antenna weight for forming a directivity pattern of a maximum antenna gain in the arrival direction; correlative calculation means for calculating a correlation between the selection reception antenna weight and an antenna weight which is an output from the steering vector generation means; maximum value detection means for detecting the maximum value of outputs from the correlative calculation means with respect to all the arrival directions; and switching means for outputting the arrival direction at a point of time at which the maximum value is detection as an estimated arrival direction.

According to the present invention, an arrival direction is estimated by using only a reception antenna weight. In particular, the present invention is preferable in the FDD method.

In addition, the present invention is characterized in that the transmission direction prediction means predicts a present arrival direction by using a past arrival direction which is estimated late because of the control of the adaptive reception unit.

According to the present invention, by a first transmission antenna weight control unit, even in the FDD method or the TDD method, a transmission direction is predicted, and a transmission antenna weight can be generated.

The present invention is characterized in that the adaptive transmission unit has: L adaptive transmission sub-blocks which receive L transmission antenna weights which are outputs from the L transmission antenna weight control units and a transmission signal and which output N antenna transmission signals for forming a directivity pattern having a gain in a user direction on the basis of the transmission antenna weights and transmitting a desired wave signal; and N adders for synthesizing the antenna transmission signals every antenna to output N combining antenna signals.

According to the present invention, a delay operation in transmission is not required to cause a mobile station to perform RAKE reception.

Each of the adaptive transmission sub-blocks according to the present invention is characterized by having: a transmission weighting combining unit which receives the transmission antenna weight and the transmission signal to form a transmission directivity pattern; and N spreading means for performing spectrum spreading to each of the N antenna transmission signals by using a pseudo random code of a desired wave signal.

According to the present invention, directivity control is performed, and spectrum spreading is performed to the N antenna transmission signals.

Furthermore, the transmission weighting combining unit according to the present invention is characterized by having N complex multipliers which receive the transmission antenna weight and the transmission signal to multiply the transmission signal by N complex transmission antenna weights, respectively.

According to the present invention, since an actual transmission direction is predicted from an estimation value of an arrival direction, the transmission direction can be made almost equal to the arrival direction of an actual reception signal.

If the present invention, more specifically, will be described with respect to FIGS. 1A and 1B (to be referred to as FIG. 1 hereinafter), the adaptive transceiver device has first to Mth path adaptive reception sub-blocks (41 to 4M in FIG. 1), first to Mth transmission antenna weight control units (81 to 8M in FIG. 1), and first to Lth adaptive transmission sub-blocks (101 to 10M in FIG. 1) for each user.

In the adaptive transceiver device according to the present invention, as is apparent from the disclosure, an arrival direction of a path is estimated from a reception antenna weight. Therefore, with respect to an adaptive reception unit for performing control based on the MMSE standards, a path arrival direction of a desired wave signal can be easily estimated. By predicting a transmission direction from the estimated arrival direction, a present arrival direction can be predicated by using a past arrival direction which is estimated late because of the control of the adaptive reception unit.

BRIEF EXPLANATION OF THE DRAWINGS

FIGS. 1A and 1B (to be referred to as FIG. 1 hereinafter) are block diagrams showing an embodiment of a k-th user adaptive transceiver device according to the present invention.

FIG. 2 is a block diagram showing an m-th path adaptive reception sub-block of the k-th user adaptive transceiver device according to the present invention.

FIGS. 7A and 7B are block diagrams showing an embodiment of a conventional k-th user adaptive transceiver device.

BEST MODE FOR CARRYING OUT THE INVENTION

Embodiments of the present invention will be described below with reference to the accompanying drawings. In this case, an adaptive transceiver device (CDMA adaptive transceiver device) in which a multiplexed signal is a code division multiple signal, the number of transmission/reception antenna is set to be N (N is an integer which is equal to or larger than 1), the number of users is set to be K (K is an integer which is equal to or larger than 1), the number of reception multi-paths per user is set to be M (M is an integer which is equal to or larger than 1), and the maximum transmission count is set to be L (L is equal to or larger than 1 and which is equal to or smaller than M) will be described below.

Figure 1A:
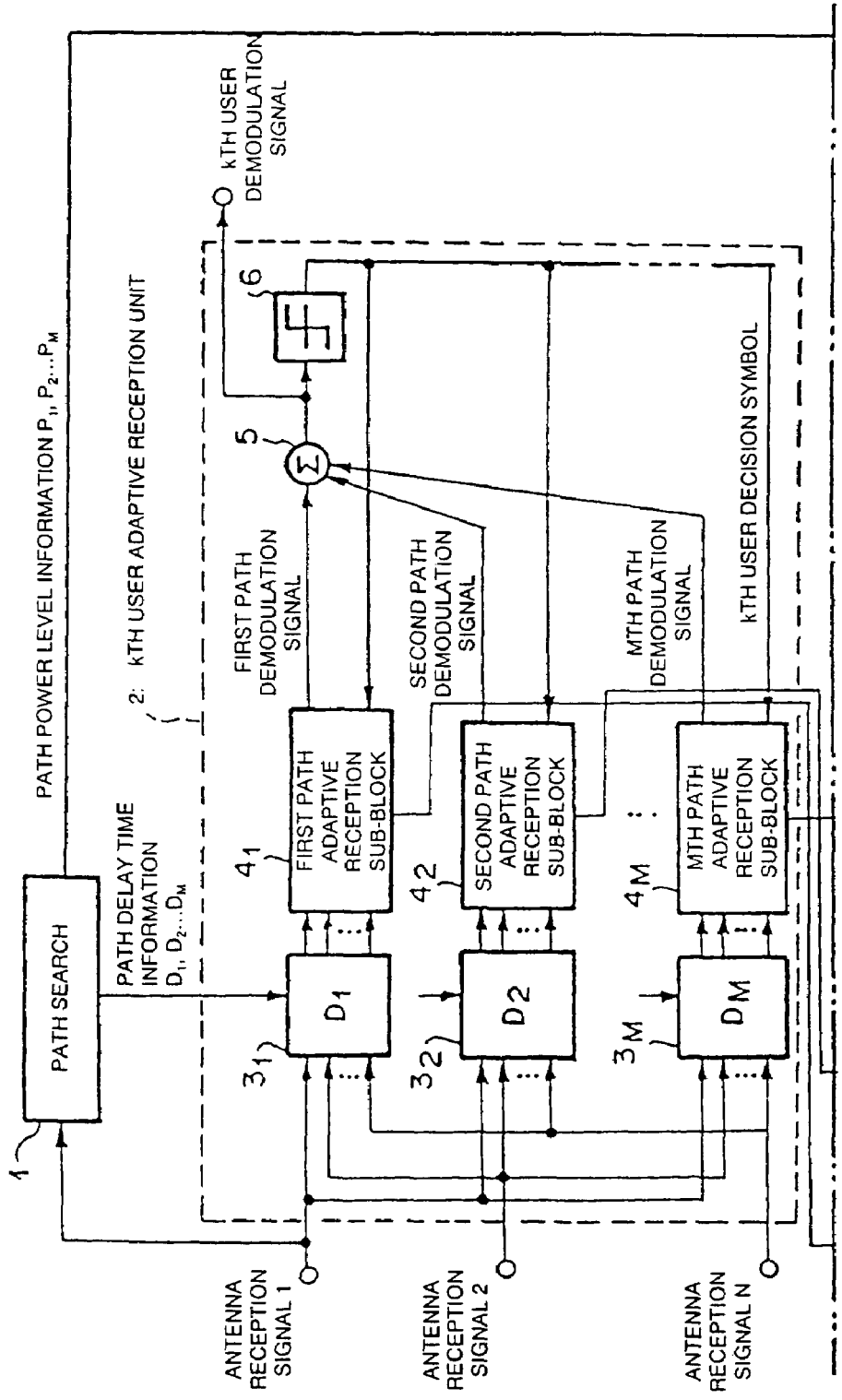

Referring to FIG. 1, a k-th user adaptive transceiver device according to the present invention is constituted by a first path search circuit 1, a first k-th user adaptive reception unit 2, a reception antenna weight selection circuit 7, first transmission antenna weight control units 81 to 8M, and a k-th user adaptive transmission unit 9. Here, k indicates an arbitrary user number in the number of all users K.

The N antenna reception signals 1 to N are a desired wave signal received by N antennas arranged and closed to each other such that the reception signals are correlated to each other and signals obtained by performing code multiplexing to a plurality of interference wave signals. The following processes are digitally performed in a base band. Therefore, it is assumed that the frequencies of the N antenna reception signals 1 to N are converted from a radio band to a base band, that the N antenna reception signals 1 to N are subjected to analog/digital conversion to be converted into base band signals serving as binary signals.

The first path search circuit 1 calculates pieces of path level information P1 to PM which are reception powers of the paths of a desired wave signal of the k-th user and pieces of path delay time information D1 to DM which are delay times of multi-paths from the reception signals performed code multiplexing by the plurality of user signals.

In this case, when reception antenna elements have omni-directional properties (non-directivity), path searching is performed by using an antenna reception signal from any one of the antenna elements. On the other hand, when the reception antenna elements have directivity, another non-directional reception antenna for path searching is prepared, or reception weighting combining is performed to reception antenna signals from the plurality of reception antenna elements. A non-directional reception directivity pattern must be formed, and path search must be performed by using the received reception signals.

The first k-th user adaptive reception unit 2 is constituted by first delay circuits 31 to 3M, first m-th path adaptive reception sub-blocks 41 to 4M, a first adder 5, and a decision circuit 6.

Here, the first delay circuits 31 to 3M delay the N antenna reception signals 1 to N every multi-path on the basis of the pieces of path delay time information D1 to DM which are outputs from the first path search circuit 1.

The first m-th path adaptive reception sub-blocks 41 to 4M will be described later.

The first adder 5 adds outputs from the first m-th path adaptive reception sub-blocks 41 to 4M to output a k-th user demodulation signal.

The decision circuit 6 performs hard decision to an output from the first adder 5 to output a k-th user decision symbol.

The reception antenna weight selection circuit 7 receives M reception antenna weights W1 to WM which are outputs from the M first m-th path adaptive reception sub-blocks 41 to 4M, the pieces of path level information P1 to PM which are outputs from the first path search circuit 1, a path level threshold value $\Delta P$, and the maximum transmission count L, and selects selection reception antenna weights Wr1 to WrL corresponding to L transmission paths from the M reception antenna weights W1 to WM on the basis of the pieces of path level information P1 to PM, the path level threshold value $\Delta P$ and the maximum transmission count L.

In selection of the selection reception antenna weights Wr1 to WrL, an arrival direction of the maximum transmission count L including the maximum power path is selected as a transmission direction from arrival directions of reception powers within the range of the level of the maximum path to the path level threshold value $\Delta P$. If the path level threshold value $\Delta P$ is not set, the L upper arrival directions of the path level are always selected as transmission directions.

In addition, when the maximum transmission count L is set to be 1, only the arrival direction of the maximum power path is always selected as a transmission direction. When a plurality of transmission paths are selected, a transmission diversity effect can be obtained.

The k-th user adaptive transmission unit 9 is constituted by first adaptive transmission sub-blocks 101 to 10L and third adders 111 to 11N.

The third adders 111 to 11N add outputs from the first adaptive reception sub-blocks 101 to 10M every antenna element, and outputs N combining antenna transmission signals 1 to N.

Thereafter, the N combining antenna transmission signals 1 to N are digital/analog-converted, and frequency conversion from a base band to a radio band is performed.

The first m-th path adaptive reception sub-blocks 41 to 4M in the k-th user adaptive receiver 2 will be described below. Referring to FIG. 2, each of the first m-th path adaptive reception sub-blocks 41 to 4M is constituted by despreading circuits 121 to 12M, a reception weighting combining unit 13, a demodulation unit 16, a third complex multiplier 19, an error detection circuit 20, a second delay circuit 21, and a reception antenna weight control circuit 22.

The first m-th path adaptive reception sub-blocks 41 to 4M receive the antenna reception signals 1 to N and a k-th user decision symbol which is an output from the decision circuit 6.

The despreading circuits 121 to 12N perform correlative calculation between the antenna reception signals 1 to N and the pseudo random code Ck of the k-th user. When it is determined that the pseudo random code Ck is a complex code consisting of two codes CkI and CkQ which are orthogonal to each other, each of the despreading circuits 121 to 12N can be realized by one complex multiplier and an averaging circuit operating over a symbol section. Each of the despreading circuits 121 to 12N can be realized by a transversal filter configuration using the pseudo random code Ck as a tap weight.

The reception weighting combining unit 13 is constituted by the first complex multipliers 141 to 14N and a second adder 15. Outputs from the despreading circuits 121 to 12N are multiplied by the reception antenna weights Wm1 to WmN by the first complex multipliers 141 to 14N and added to each other, so that a signal received by an antenna directivity pattern inherent in the m-th path is generated.

The demodulation unit 16 is constituted by a transmission path estimation circuit 17 and a second complex multiplier 18. An output obtained such that an output from the reception weighting combining unit 13 is multiplied by the complex conjugate of a transmission path estimation output obtained by causing the transmission path estimation circuit 17 to estimate a transmission path is used as an output from the first m-th path adaptive reception sub-block 4m. Outputs from the first m-th path adaptive reception sub-block 4m are added to each other by the other first path adaptive reception sub-block 41 to the Mth path adaptive reception sub-block 4M and the first adder 5, and a resultant value is used as a demodulation signal of the k-th user.

The third complex multiplier 19 multiplies a k-th user decision symbol by the transmission path estimation output.

Here, when the k-th user decision symbol is multiplied by the transmission path estimation values of the respective paths, only components related to the phases of the estimation values can also be multiplied, amplitudes calculated by another means may also be multiplied. Another means indicates such a means that a reception power is measured to calculate an amplitude.

The error detection circuit 20 calculates the difference between an output from the third complex multiplier 19 and an output from the reception weighting combining unit 13 to detect a reception antenna weight control error em.

The second delay circuit 21 delays outputs from the despreading circuits 121 to 12N depending on process times of the reception weighting combining unit 13, the demodulation circuit 16, the error detection circuit 20, and the like.

The reception antenna weight control circuit 22 calculates reception antenna weights Wm1 to WmN from a reception antenna weight control error em and an output from the second delay circuit 21. Here, the m-th reception antenna weights Wm1 to WmN are adaptively controlled by the MMSE standards such that the mean square of the reception antenna weight control error em is minimized. The reception antenna weights Wm1 to WmN obtained by using an LSM algorithm as an update algorithm having a small amount of operation are expressed by:

$$Wm(i+1) = Wm(i) + \mu r(i-Ddem) em^*(i) \quad (1)$$

where, Wm(i) (row vector having N elements) is a reception antenna weight of an ith symbol in the m-th path of the k-th user; r(i) (row vector having N elements) is an antenna reception signal; μ is a step size; and Ddem is a delay time given by the second delay circuit 21. Reference symbol * indicates a complex conjugate.

The reception antenna weights Wm1 to WmN are updated by equation (1) every symbol. The step size which is a coefficient of an amount of change when the reception antenna weights Wm1 to WmN are updated is characterized as follows. That is, when the step size μ is large, convergence to the reception antenna weights Wm1 to WmN for forming an optimum directivity pattern becomes fast, but the accuracy and stability of adaptation are degraded. When the step size μ is small, the accuracy and stability of adaptation are excellent, but convergence becomes slow. A method which adaptively changes the step size to obtain a sufficient convergence speed and sufficiently accurate and stable adaptation is also included in the present invention.

Here, in the convergence process of adaptive control, a known symbol may also be used in place of a decision symbol.

Figure 3:
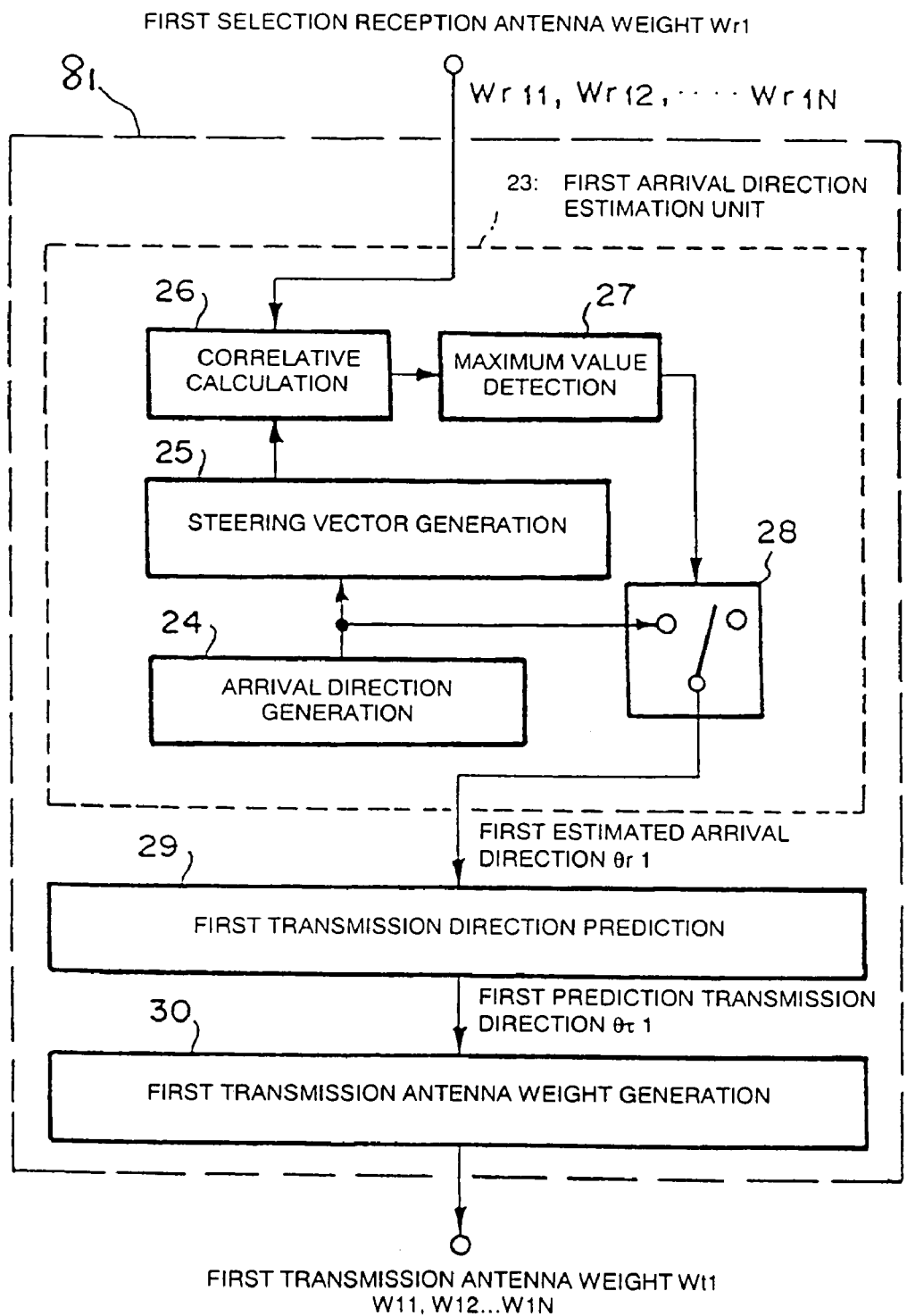
FIG. 3 is a block diagram showing a first transmission antenna weight control unit of the k-th user adaptive transceiver device according to the present invention.

A first transmission antenna weight control unit 81 will be described below with reference to FIG. 3. The first transmission antenna weight control unit 81 receives a first from the reception antenna weight selection circuit 7, and is constituted by a first arrival direction estimation unit 23, a first transmission direction prediction circuit 29, and a first transmission antenna weight generation circuit 30.

The first arrival direction estimation unit 23 is constituted by an arrival direction generation circuit 24, a steering vector generation circuit 25, a correlative calculation circuit 26, a maximum value detection circuit 27, and a switching circuit 28. The first arrival direction estimation unit 23 receives the selection reception antenna weight Wr1 which is an output from the reception antenna weight selection circuit 7.

The arrival direction generation circuit 24 sweeps arrival directions of reception signals over all the directions. The steering, vector generation circuit 25 calculates an antenna weight (steering vector) for forming a directivity pattern having a maximum antenna gain with respect to an arrival direction which is an output from the arrival direction generation circuit 24.

The correlative calculation circuit 26 calculates correlation between the selection reception antenna weight Wr1 which is output from the reception antenna weight selection circuit 7 and the antenna weight which is an output from the steering vector generation circuit 25.

The maximum value detection circuit 27 detects the maximum value of an output from the correlative calculation circuit 26 with respect to all the arrival directions which are outputs from the arrival direction generation circuit 24.

The switching circuit 28 switches the timings of the arrival directions which are outputs from the arrival direction generation circuit 24 when the maximum value of the output from the correlative calculation circuit 26 to be detected, and outputs the arrival direction as an estimated arrival direction θr1.

Figure 5:
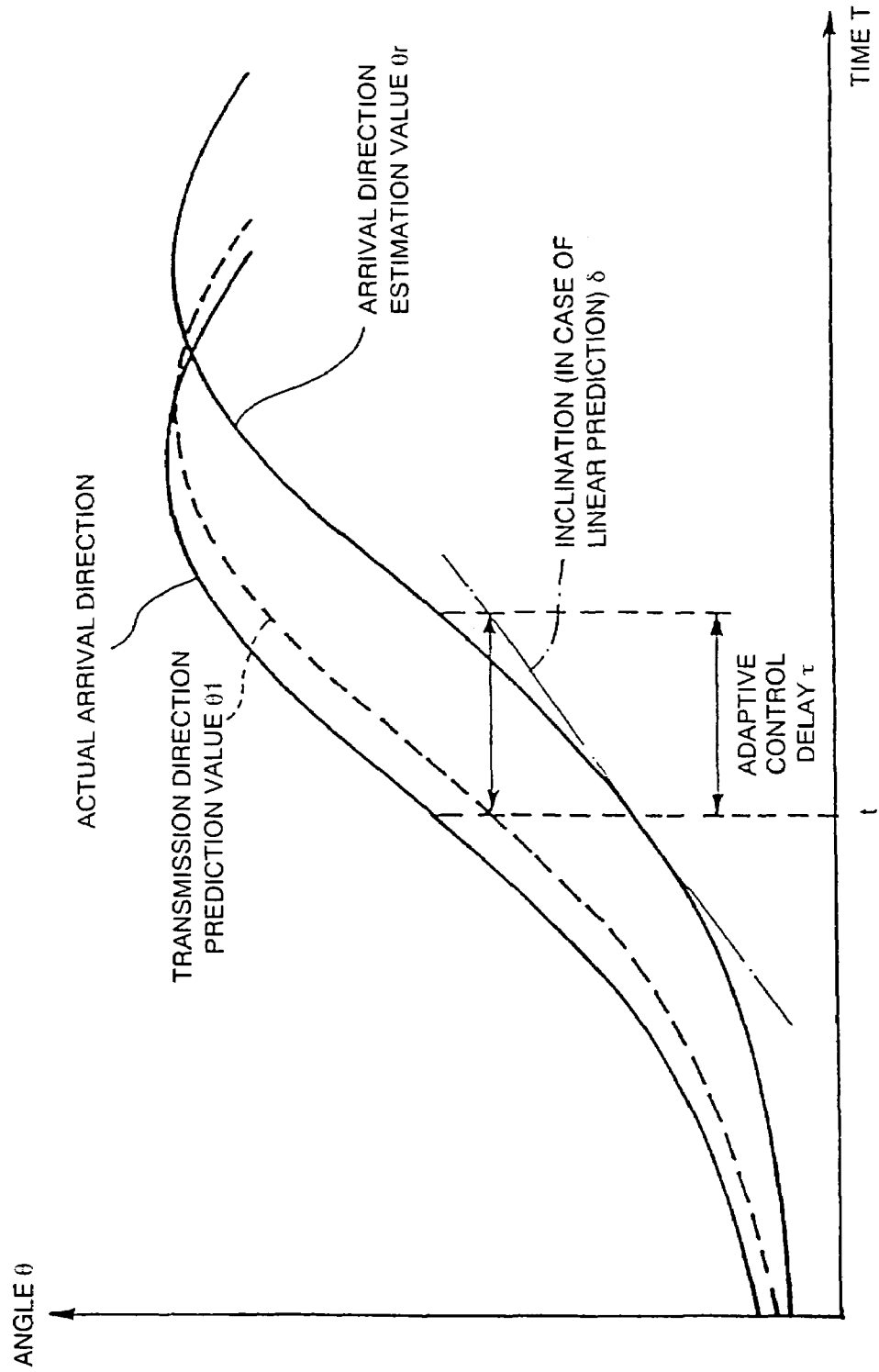
FIG. 5 is a graph showing an operation of a first transmission direction prediction circuit of the k-th user adaptive transceiver device according to the present invention.

The operation of the first transmission direction prediction circuit 29 is shown in FIG. 5. The first transmission direction prediction circuit 29 predicts a transmission direction θr1 on the basis of the estimated arrival direction θr1 which is an output from the first arrival direction estimation unit 23. In the graph, the abscissa indicates time, and the ordinate indicates angles of the estimated arrival direction, the actual arrival direction, and the prediction transmission direction. Referring to FIG. 5, the arrival direction estimation value θr1 estimated from the first selection reception antenna weight Wr1 is compared with the actual arrival direction, and adaptive delay τ occurs by time required for adaptive control.

Therefore, for example, in linear prediction, when an inclination δ is calculated from the change of time of the arrival direction estimation value θr1, a transmission direction prediction value θt1 is expressed by:

$$\theta t1(t)=\theta r1(t)+\delta\theta \times \tau \qquad (2)$$

where the arrival direction estimation value θt1(t) and the transmission direction prediction value θt1(t) are functions of time t.

Unlike the linear prediction, a method which adaptively predicts the transmission direction prediction value θt1 such that a mean square error between the transmission direction estimation value θt1 and the arrival direction estimation value θr1 is possible. In this manner, when the transmission direction is predicted from the arrival direction estimation value, a present arrival direction can be predicted by using a past arrival direction which is estimated late because of the control of the adaptive reception unit.

The first transmission antenna weight generation circuit 30 calculates a transmission antenna weight (steering vector) Wt1 for forming a directivity pattern having a gain in a transmission direction on the basis of the prediction transmission direction θt1 which is an output from the first transmission direction prediction circuit 29.

Figure 4:
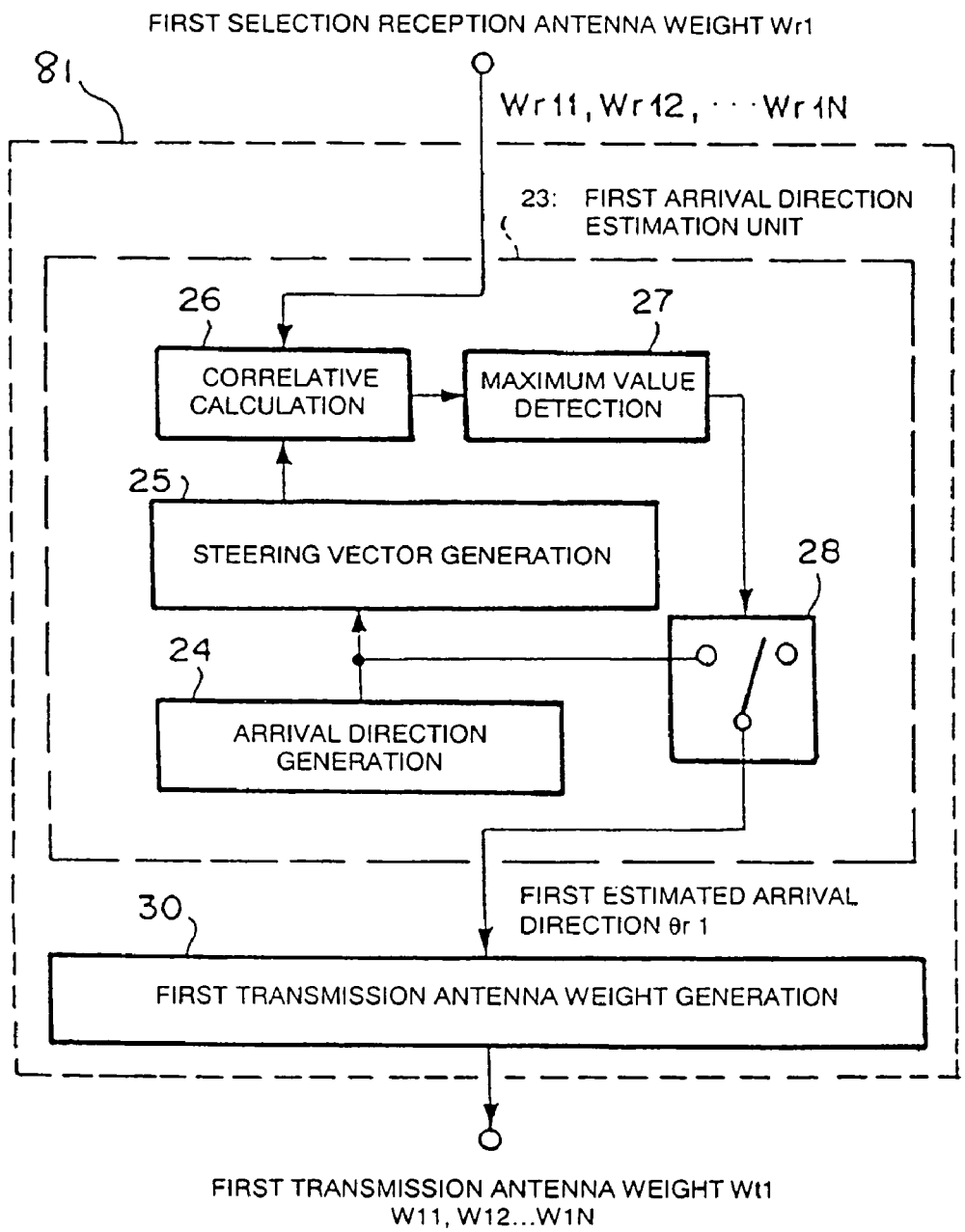
FIG. 4 is a block diagram showing another embodiment of the first transmission antenna weight control unit of the k-th user adaptive transceiver device according to the present invention.

The first transmission antenna weight control unit 81 shown in FIG. 4 is an embodiment in which the reception antenna weight control circuit 22 is controlled at a sufficiently high speed, and the estimated arrival direction θr1 estimated from the first selection reception antenna weight Wr1 is almost equal to the present arrival direction. In this case, the first transmission antenna weight generation circuit 30 is not required.

Figure 6:
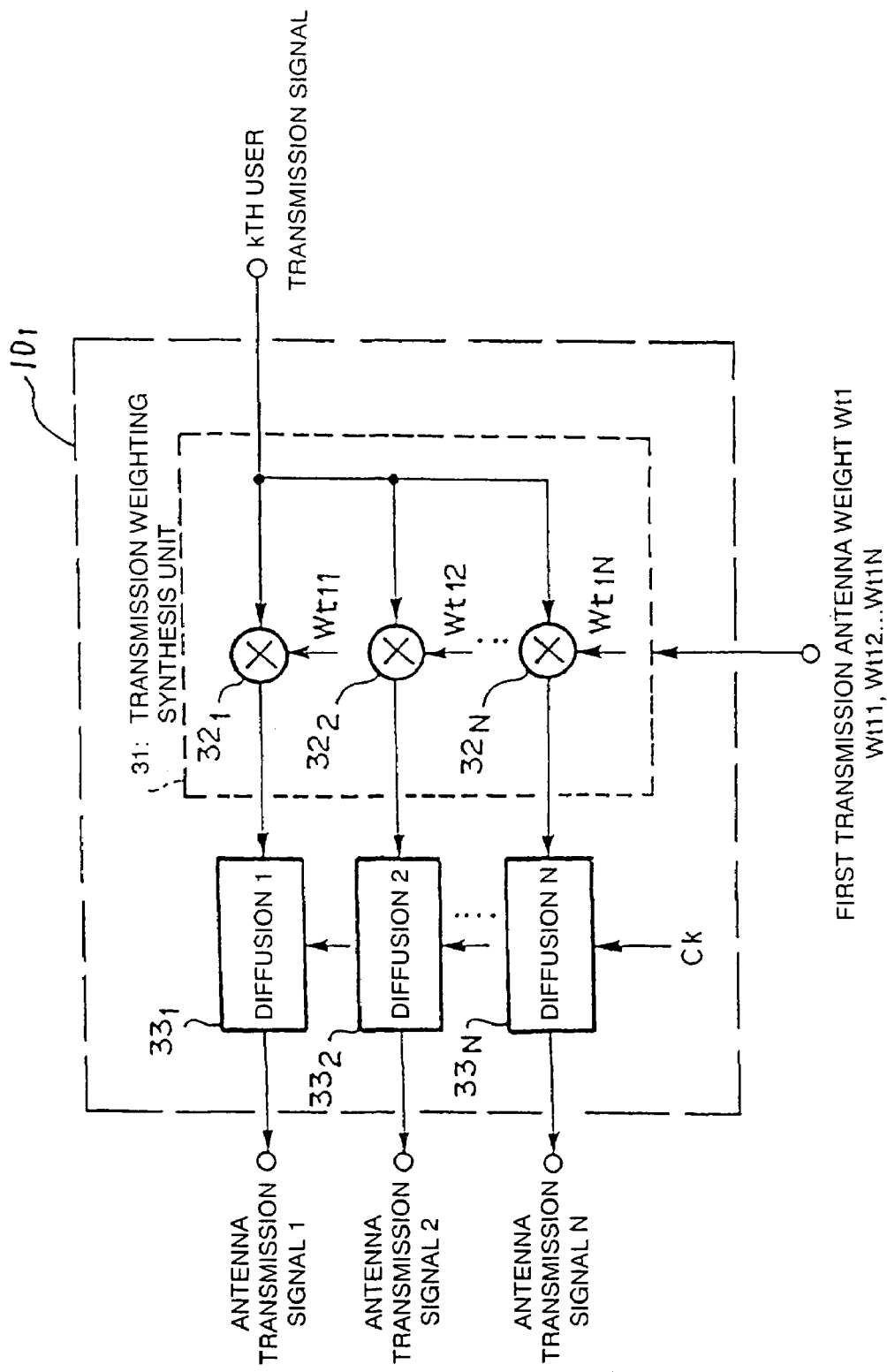
FIG. 6 is a block diagram showing a first adaptive transmission sub-block of the k-th user adaptive transceiver device according to the present invention.
Figure 8:
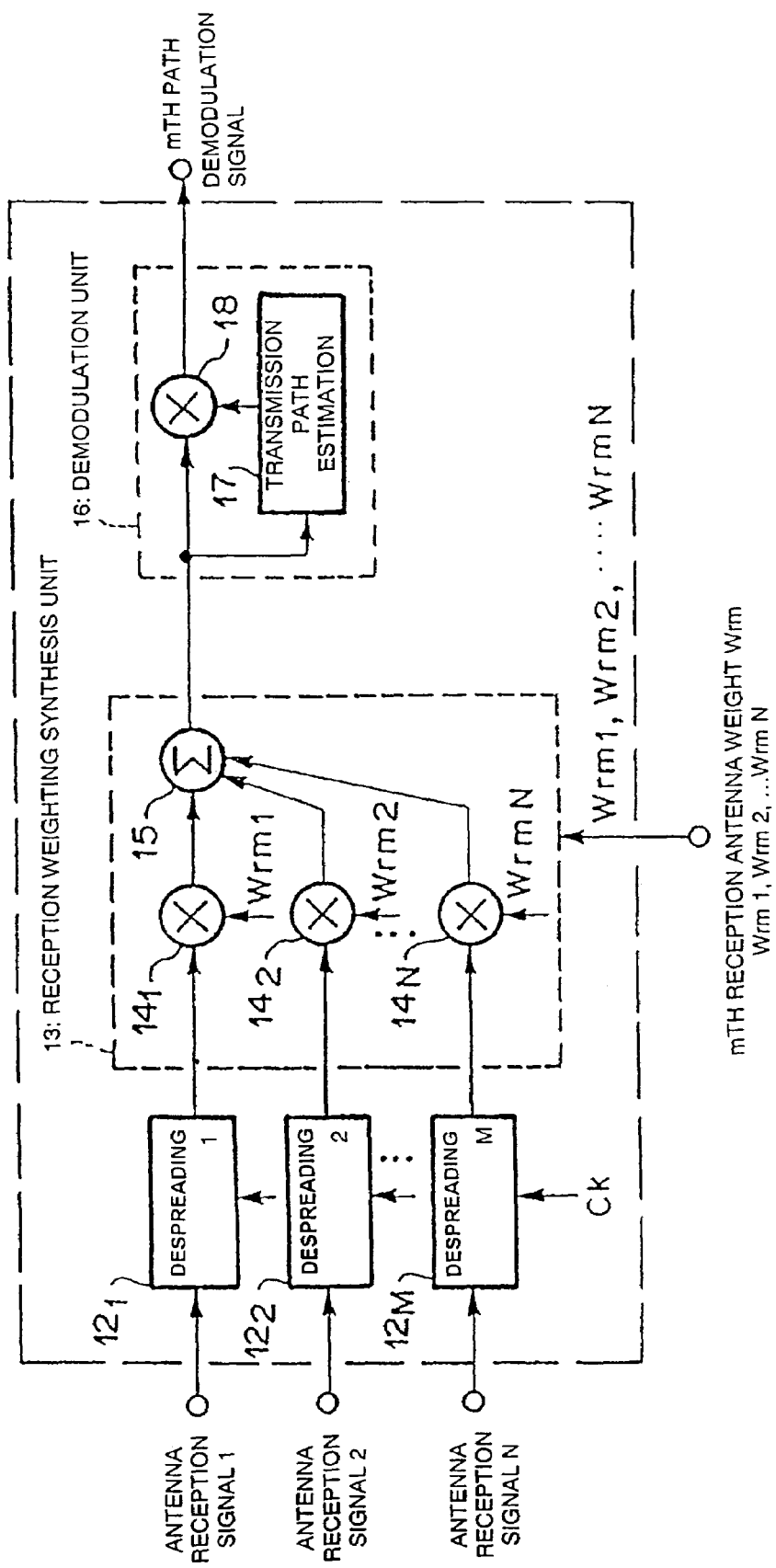
FIG. 8 is a block diagram showing an m-th path adaptive reception sub-block of the conventional k-th user adaptive transceiver device.
Figure 9:
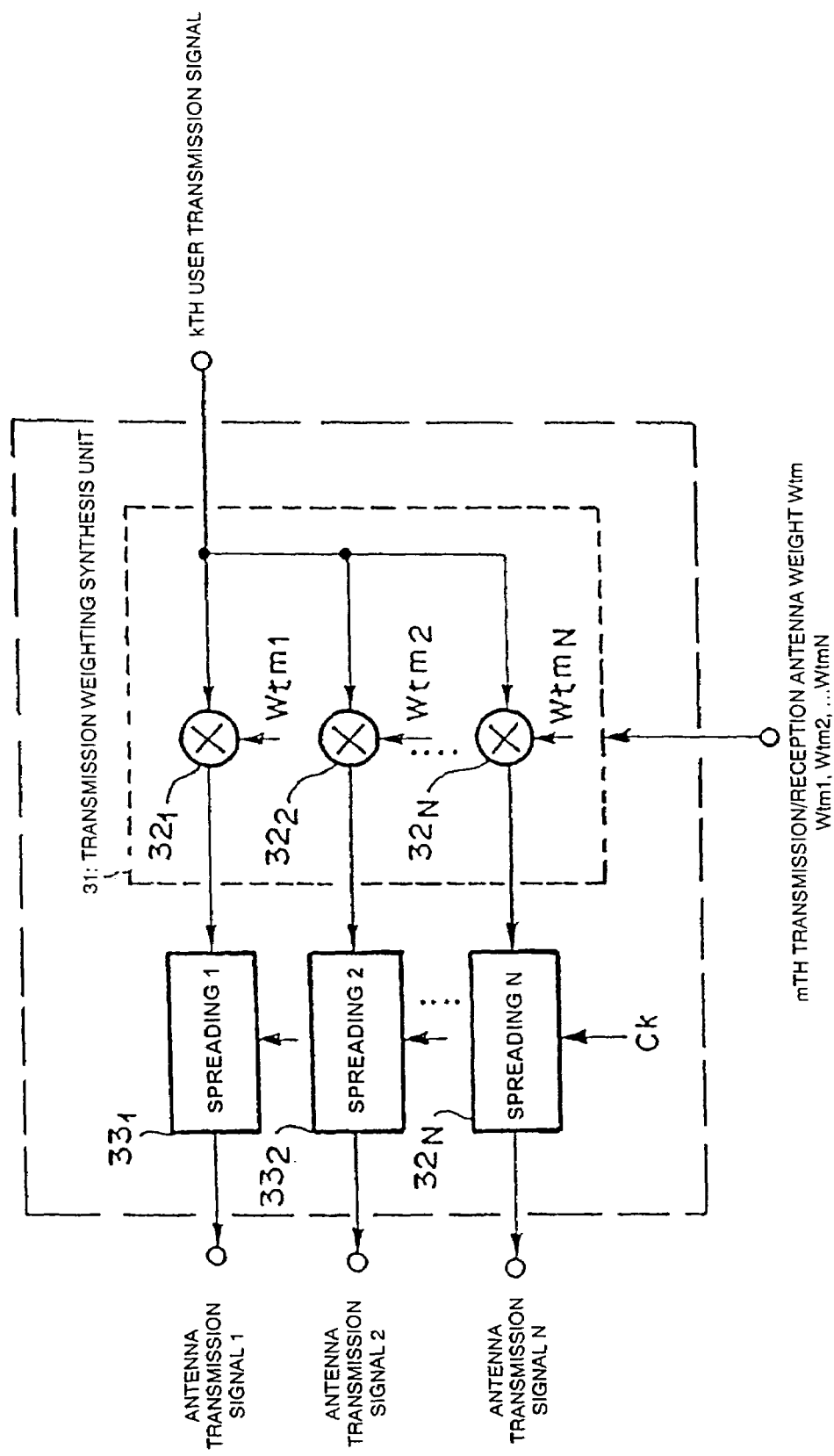
FIG. 9 is a block diagram showing an m-th path adaptive transmission sub-block of the conventional k-th user adaptive transceiver device.
Figure 10:
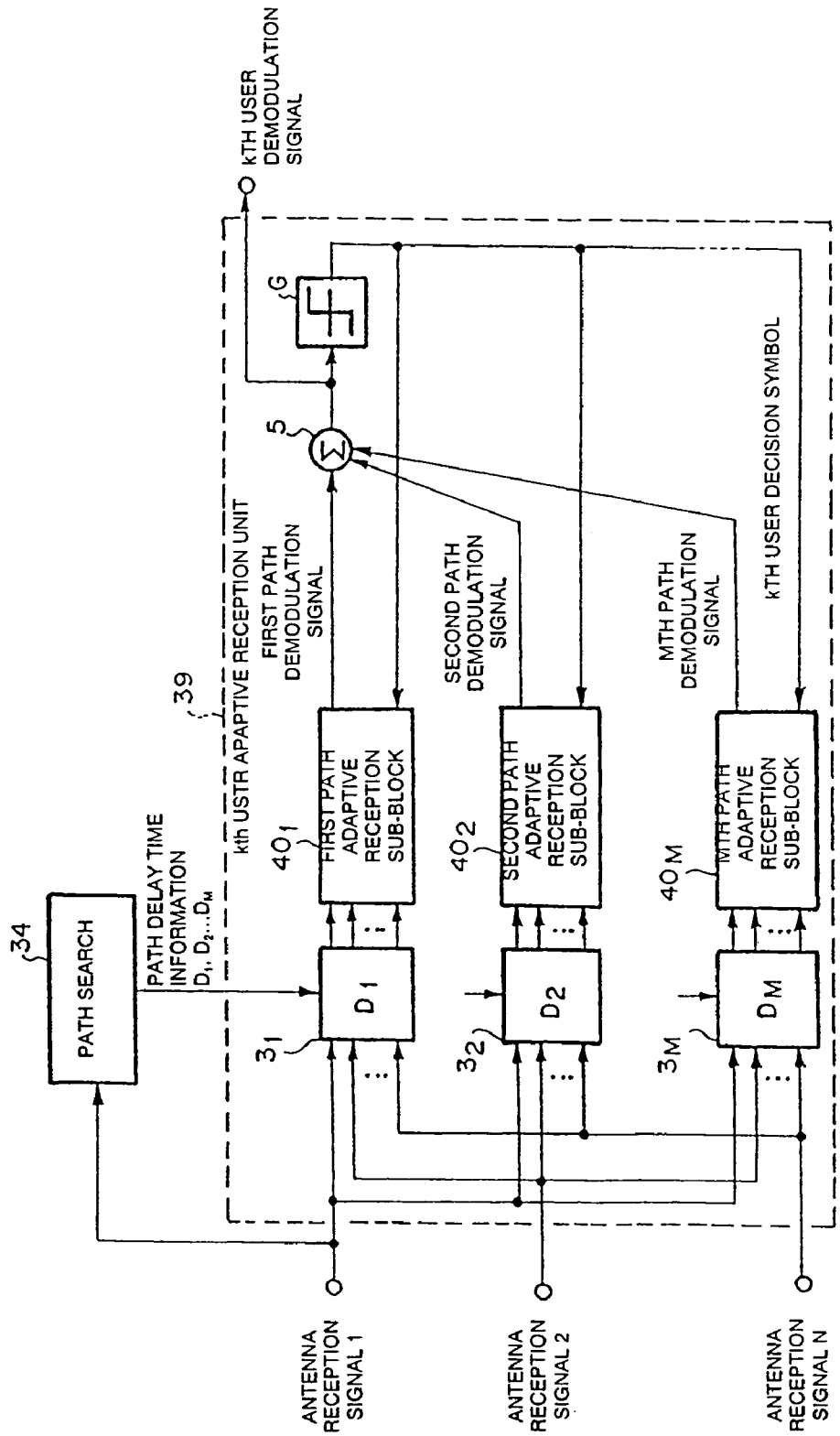
FIG. 10 is a block diagram showing an embodiment of a conventional k-th user adaptive receiver device.
Figure 11:
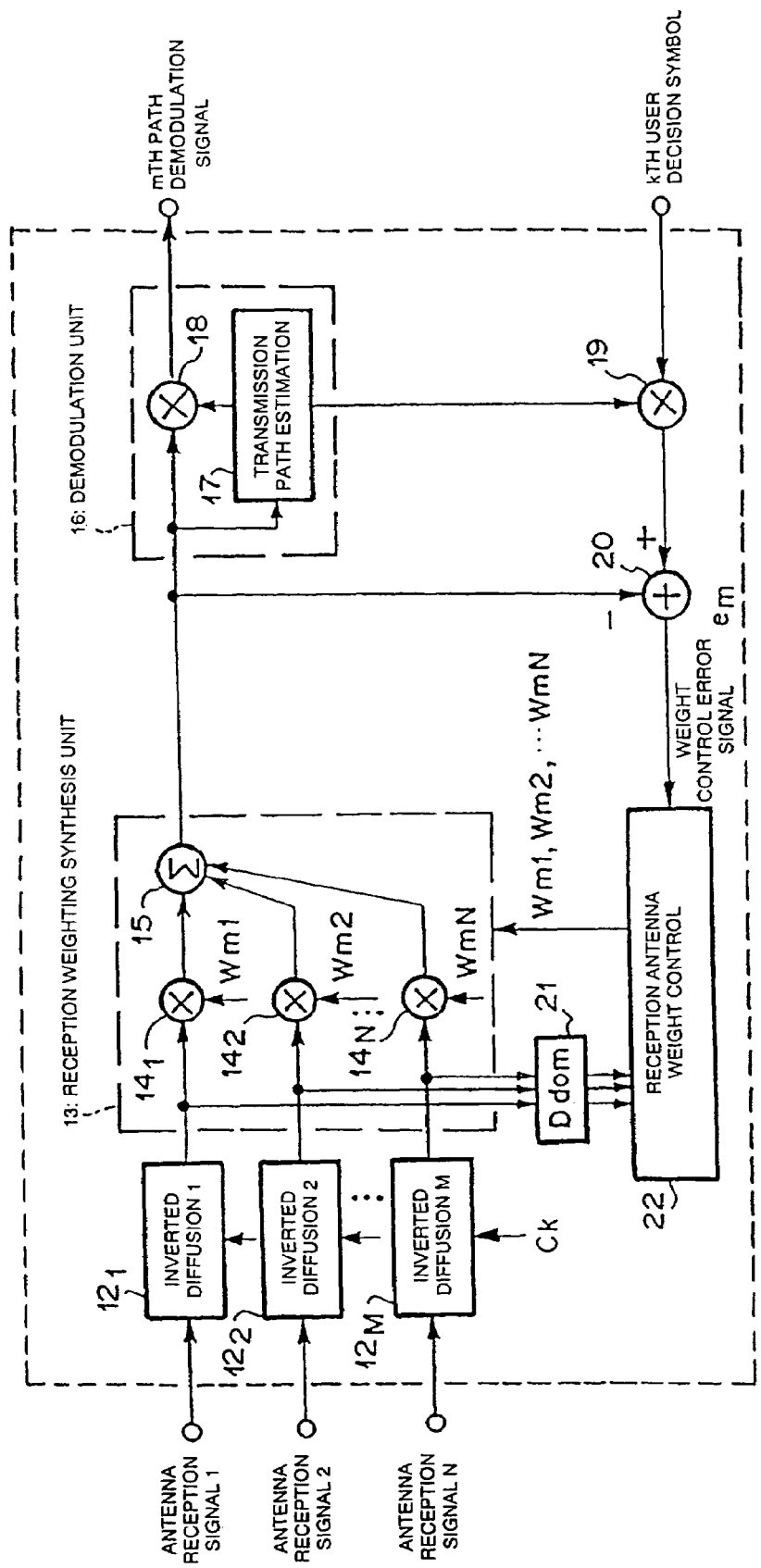
FIG. 11 is a block diagram showing an m-th path adaptive reception sub-block of the conventional k-th user adaptive transceiver device.

Referring to FIG. 6, each of the first adaptive transmission sub-blocks 101 to 10M in the k-th user adaptive transmission unit 9 is constituted by a transmission weighting combining unit 31 and spreading circuits 331 to 33M. The first adaptive transmission sub-blocks 101 to 10M receive transmission antenna weights Wtl to WtL which are outputs from transmission antenna weight generation circuits 301 to 30L, and a k-th user transmission signal.

The transmission weighting combining unit 31 is constituted by fourth complex multipliers 321 to 32N. When the k-th user transmission signal is multiplied by the first transmission antenna weight Wtl (Wtl1 to WtlN), a signal transmitted by a first inherent antenna directivity pattern is generated.

The spreading circuits 331 to 33N diffuse N outputs from the transmission weighting combining unit 31 by using a pseudo random code Ck of the k-th user to generate N antenna transmission signals 1 to N. When the pseudo random code Ck is considered as a complex code consisting of two codes CkI and CkQ which are orthogonal to each other, each of the spreading circuits 331 to 33N is realized by one complex multiplier and an averaging circuit operating over a symbol section. Each of the spreading circuits 331 to 33N can also be realized by a transversal filter configuration using the code Ck as a tap weight.

In the embodiment of the present invention, the code length of the pseudo random code Ck, i.e., a spreading rate is not limited. The adaptive receiver device according to the present invention can also be applied to a signal having a spreading rate of 1 and multiplexed by a system other than a code division multiple access system.

In the embodiment of the present invention, arrangement intervals between the reception antennas. For example, a wavelength which is ½ that of a carrier wave is used. In addition, in the embodiment of the present invention, the number N of reception antennas is not limited.

Furthermore, in the embodiment according to the present invention, the arrangement of the reception antennas is not limited. For example, a circular arrangement or a straight arrangement is used.

In the embodiment of the present invention, the directivity of a single reception antenna is not limited. For example, an omni-antenna or a sector antenna is used.

In addition, in the embodiment of the present invention, the number K of users which simultaneously receive signals and the number M of multi-paths of each user are not limited.

According to the present invention, in the k-th user adaptive reception unit, since the control method based on the MMSE standards is used, a directivity pattern which actively decreases a gain with respect to an interference wave is formed in the reception unit of the k-th user adaptive transceiver device.

According to the present invention, there is provided a means which estimates a path arrival direction of a desired wave signal by using a reception antenna weight of the k-th user adaptive reception unit and which generates a transmission antenna weight on the basis of the path arrival direction. For this reason, desired wave arrival direction estimation means for calculating the transmission antenna weight of the transmission unit of the k-th user adaptive transceiver device is not prepared independently of the reception unit.

INDUSTRIAL APPLICABILITY

As has been described above, the present invention can be applied to an adaptive transceiver device in a base station which mainly copes with a plurality of mobile stations of a mobile communication system. Since there is provided means which estimates a path arrival direction of a desired wave signal by using a reception antenna weight of the k-th user adaptive reception unit and which generates a transmission antenna weight on the basis of the path arrival direction, a merit of the preaent invention is that a desired wave arrival direction estimation means for calculating the transmission antenna weight of the transmission unit of the k-th user adaptive transceiver device does not need to be prepared independently of the reception unit.

The adaptive transceiver device according to the present invention can be used in the equipment of a base station using the cdma-One system or the W-CDMA system, and can make a transmission power constant in a predetermined direction by weighting or the like depending on reception sensitivity.

The invention claimed is:

1. An adaptive transceiver device of a CDMA (Code Division Multiple Access) system characterized by comprising:
   path search means for calculating path level information and path delay time information from antenna reception signals;
   M (M is a positive integer) adaptive reception units for receiving N (N is a positive integer) antenna reception signals, forming reception directivity patterns each having a gain in the direction of a desired wave signal every path delay time, receiving the desired wave signals, and suppressing interference wave signals;

reception antenna weight selection means for selecting reception antenna weights for L (L is an integer equal to or smaller than M) transmission paths among M reception antenna weights by using the path level information;

L transmission antenna weight control units for determining transmission antenna weights for forming transmission directivity patterns by using outputs from the reception antenna weight selection means; and an adaptive transmission unit for forming the transmission directivity pattern having a gain in a user direction by using the transmission antenna weight which is an output from the transmission antenna weight control unit and outputting N combining antenna transmission signals for transmitting the desired wave signal, the adaptive transmission unit having L adaptive transmission sub-blocks which receive L transmission antenna weights which are outputs from the L transmission antenna weight control units and a transmission signal and which output N antenna transmission signals for forming a directivity pattern having a gain in a user direction on the basis of the transmission antenna weights and transmitting a desired wave signal.

2. The adaptive transceiver device according to claim 1, characterized in that the adaptive reception unit has: M delay means which receive the N antenna reception signals and the path delay time information which is an output from the path search means and which match timings depending on the path delay times of M multi-paths; M adaptive reception sub-blocks for forming the reception directivity patterns having gains in the directions of the M multi-paths, suppressing the interference wave signal, and receiving and demodulating the desired wave signal; an adder for synthesizing M demodulation signals; and decision means for performing hard decision to output a decision symbol.

3. The adaptive transceiver device according to claim 2, characterized in that the antenna reception signal is a code division multiple access (CDMA) signal, and each of the M adaptive reception sub-blocks has: N despreading means which receive the N antenna reception signals and the decision symbol and performs despreading to each of the antenna reception signals by using a pseudo random code of the desired wave signal; a reception weighting combining unit for forming the reception directivity pattern; a demodulation unit for performing the transmission path estimation; a multiplier for multiplying the decision symbol by a complex transmission path estimation value which is an output from the demodulation unit to cancel a phase change caused by carrier wave phase synchronization; error detection means for subtracting each output from the despreading means from an output from the multiplier; delay means for delaying outputs from the N despreading means depending on the process times of the reception weighting combining means, the demodulation means; and reception antenna weight control means for outputting the reception antenna weight on the basis of the minimum mean square error (MMSE) standards such that the average power of the reception antenna weight control error is minimized by using an output from the delay means and the reception antenna weight control error.

4. The adaptive transceiver device according to claim 3, characterized in that the reception weighting combining unit has: N complex multipliers which receive the N antenna reception signals and the reception antenna weights and which multiply the reception signals by N complex reception antenna weights; and an adder for synthesizing respective outputs from the N complex multipliers.

5. The adaptive transceiver device according to claim 3, characterized in that the demodulation means has:

transmission path estimation means which receives an output from the weighting combining unit to estimate the amplitude and the phase of a carrier wave; complex conjugate operation means for calculating a complex conjugate of complex transmission path estimation values which are output from the transmission path estimation means; and a multiplier for multiplying an output from the complex conjugate operation means by an output from the despreading means to perform carrier wave phase synchronization and, at the same time, to perform weighting for synthesizing a maximum ratio.

6. The adaptive transceiver device according to claim 4, characterized in that the demodulation means has:

transmission path estimation means which receives an output from the weighting combining unit to estimate the amplitude and the phase of a carrier wave; complex conjugate operation means for calculating a complex conjugate of complex transmission path estimation values which are output from the transmission path estimation means; and a multiplier for multiplying an output from the complex conjugate operation means by an output from the despreading means to perform carrier wave phase synchronization and, at the same time, to perform weighting for synthesizing a maximum ratio.

7. The adaptive transceiver device according to claim 1, characterized in that the reception antenna weight selection means receives M reception antenna weights which are outputs from the M adaptive reception sub-blocks, path level information which is an output from the path search means, a path level threshold value, and a maximum transmission count Lmax, and selects a selection reception antenna weight corresponding to L paths the number of which is not larger than the maximum transmission count Lmax and which has a level set within the range of the level of the maximum path to the path level threshold value from the M reception antenna weights.

8. The adaptive transceiver device according to claim 1, characterized in that the transmission antenna weight control unit has: an arrival direction estimation unit which receives the selection reception antenna weight to estimate an estimated arrival direction from the election reception antenna weight; and a transmission antenna weight generation means for calculating a transmission antenna weight for forming a directivity pattern having a gain in the estimated arrival direction which is an output from the arrival direction estimation unit.

9. The adaptive transceiver device according to claim 1, characterized in that the transmission antenna weight control unit has: an arrival direction estimation unit which receives the selection reception antenna weight to estimate an estimated arrival direction from the selection reception antenna weight; transmission direction prediction means for predicting a transmission direction on the basis of the estimated arrival direction which is an output from the arrival direction estimation unit; and transmission antenna weight generation means for calculating a transmission antenna weight for forming a directivity pattern having a gain in the prediction transmission direction which is an output from the transmission direction prediction means.

10. The adaptive transceiver device according to claim 2, characterized in that the reception antenna weight selection means receives M reception antenna weights which are outputs from the M adaptive reception sub-blocks, path level information which is an output from the path search means, a path level threshold value, and a maximum transmission count Lmax, and selects a selection reception antenna weight corresponding to L paths the number of which is not larger than the maximum transmission count Lmax and which has a level set within the range of the level of the maximum path to the path level threshold value from the M reception antenna weights.

11. The adaptive transceiver device according to claim 2, characterized in that the transmission antenna weight control unit has: an arrival direction estimation unit which receives the selection reception antenna weight to estimate an estimated arrival direction from the selection reception antenna weight; and transmission antenna weight generation means for calculating a transmission antenna weight for forming a directivity pattern having a gain in the estimated arrival direction which is an output from the arrival direction estimation unit.

12. The adaptive transceiver device according to claim 2, characterized in that the transmission antenna weight control unit has: an arrival direction estimation unit which receives the selection reception antenna weight to estimate an estimated arrival direction from the selection reception antenna weight; transmission direction prediction means for predicting a transmission direction on the basis of the estimated arrival direction which is an output from the arrival direction estimation unit; and transmission antenna weight generation means for calculating a transmission antenna weight for forming a directivity pattern having a gain in the prediction transmission direction which is an output from the transmission direction prediction means.

13. The adaptive transceiver device according to claim 11, characterized in that the arrival direction estimation unit has: arrival direction generation means which receives the selection reception antenna weight to sweep arrival directions over all the directions; steering vector generation means for calculating an antenna weight for forming a directivity pattern of a maximum antenna gain in the arrival direction; correlative calculation means for calculating a correlation between the selection reception antenna weight and an antenna weight which is an output from the steering vector generation means; maximum value detection means for detecting the maximum value of outputs from the correlative calculation means with respect to all the arrival directions; and switching means for outputting the arrival direction at a point of time at which the maximum value is detected as an estimated arrival direction.

14. The adaptive transceiver device according to claim 12, characterized in that the transmission direction prediction means predicts a present arrival direction by using a past arrival direction which is estimated late because of the control of the adaptive reception unit.

15. The adaptive transceiver device according to claim 1, characterized in that the adaptive transmission unit has: N adders for synthesizing the antenna transmission signals every antenna to output N combining antenna signals.

16. The adaptive transceiver device according to claim 2, characterized in that the adaptive transmission unit has: L adaptive transmission sub-blocks which receive L transmission antenna weights which are outputs from the L transmission antenna weight control units and a transmission signal and which output N antenna transmission signals for forming a directivity pattern having a gain in a user direction on the basis of the transmission antenna weights and transmitting a desired wave signal; and N adders for synthesizing the antenna transmission signals every antenna to output N combining antenna signals.

17. The adaptive transceiver device according to claim 15, characterized in that each of the adaptive transmission sub blocks has: a transmission weighting combining unit which receives the transmission antenna weight and the transmission signal to form a transmission directivity pattern; and N spreading means for performing spectrum spreading to each of the N antenna transmission signals by using a pseudo random code of a desired wave signal.

18. The adaptive transceiver device according to claim 17, characterized in that the reception antenna weight is updated every symbol, and the step of updating the reception antenna weight is determined depending on the degree of convergence of the reception antenna weight.

19. The adaptive transceiver device according to claim 18, characterized in that the transmission weighting combining unit has N complex multipliers which receive the transmission antenna weight and the transmission signal and which multiply the transmission signal by N complex transmission antenna weights.

* * * * *